(No Model.)
A. McL. HAWKS.
WOODEN PIPE.
No. 478,105. Patented July 5, 1892.
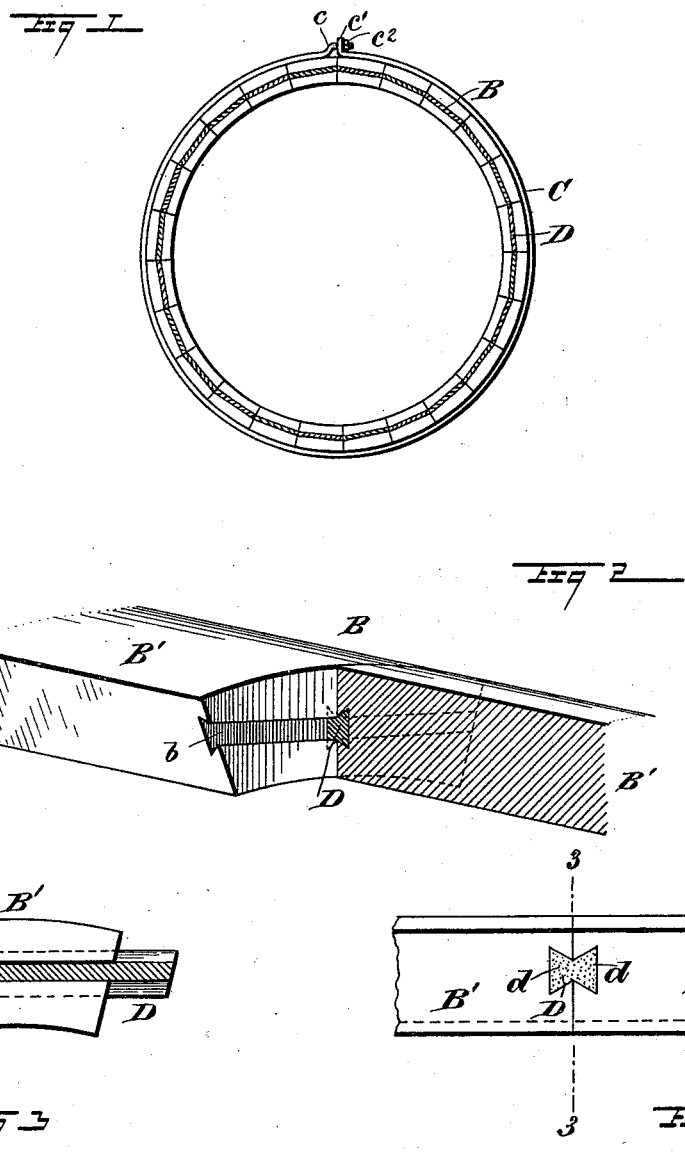
WITNESSES:
H. Walker
C. Sedgwick
INVENTOR:
A. McL. Hawks
BY Munn & Co.
ATTORNEYS

UNITED STATES PATENT OFFICE.

ARCHIE McL. HAWKS, OF TACOMA, WASHINGTON.

WOODEN PIPE.

SPECIFICATION forming part of Letters Patent No. 478,105, dated July 5, 1892.

Application filed November 14, 1891. Serial No. 411,946. (No model.)

*To all whom it may concern:*

Be it known that I, ARCHIE McL. HAWKS, of the city of Tacoma, county of Pierce, and State of Washington, have invented a new and Improved Wooden Pipe, of which the following is a full, clear, and exact description.

The invention relates to wooden pipes for use as conduits and for like purposes; and the object of the invention is to provide an efficient pipe of this character having great strength and durability.

The invention consists in the novel construction hereinafter described, and defined in the claims.

Reference is to be had to the accompanying drawings, forming a part of this specification, in which similar letters of reference indicate corresponding parts in all the figures.

Figure 1 is a sectional end elevation of a pipe constructed in accordance with my invention. Fig. 2 is a detail perspective view, partly in section, of a portion thereof at the joint of two adjacent sections. Fig. 3 is a cross-section on line 3 3, Fig. 4; and Fig. 4 is a broken side view of two jointed staves.

The pipe is made in lengths or sections, as is usual in pipes of other constructions, and each length is made up of staves B and banded by means of bands C, which are constructed to be tightened. The bands C in the present instance are formed at one end with a threaded offset $c$, which enters an eye in the opposite end $c'$, the latter being bent at right angles to the band. A nut $c^2$, screwed onto the threaded end $c$ to a bearing against the bent end $c'$, serves to tighten the band on the pipe and tightly close the longitudinal joints thereof.

The staves B are made in sections B' of suitable length, and in each end of such stave-sections a transverse dovetailed groove $b$ is formed about centrally of the end, and the ends thus grooved are placed in juxtaposition, as shown, to form jointly a double dovetail groove. In the groove thus formed a double dovetailed block D is forced, the opposing dovetailed ends $d$ meeting at the center of the block, and such dovetailed ends are made of such a size relatively to the grooves $b$ as to completely fill such grooves when inserted therein and act to force the opposed ends of the staves thus joined into close contact, and thereby form a tight joint in which the dovetailed connecting-block will not be visible.

In addition to the bands and end joints the pipe is further improved by being made impervious to moisture and other deleterious agents.

The pipe thus constructed is cheap, strong, and durable, and will be found very serviceable in the construction of conduits and the like.

Any other form of securing devices may be provided for the ends of the bands C.

Although I have specifically described a pipe embodying my invention it will readily be understood that tubs, vats, and the like may also be constructed in accordance with the invention.

Having thus described my invention, I claim as new and desire to secure by Letters Patent—

1. As a new article of manufacture, a pipe-tube or like article formed of staves, the latter having transverse dovetailed grooves in their ends, the opposing grooved ends being united by double dovetail blocks fitting said grooves and serving to maintain the ends of opposing staves in close contact, substantially as described.

2. The herein-described impervious wooden pipe, the same being formed of staves having bands encircling the same, the bands being means for tightening them on the pipe, and the staves being united together at the ends by double dovetail blocks fitting corresponding grooves in the opposed ends of the staves, substantially as described.

ARCHIE McL. HAWKS.

Witnesses:
J. B. GALVIN,
CATHERINE WOODS.